United States Patent [19]

Noble et al.

[11] Patent Number: 4,805,037
[45] Date of Patent: Feb. 14, 1989

[54] IMAGE RECORDING SYSTEM

[75] Inventors: Stephen A. Noble, Rochester; Thomas C. Nutting, Fairport, both of N.Y.

[73] Assignee: Eastman Kodak Company, Rochester, N.Y.

[21] Appl. No.: 109,159

[22] Filed: Oct. 15, 1987

[51] Int. Cl.⁴ .............................................. H04N 5/76
[52] U.S. Cl. .................................. 358/335; 358/909; 354/76; 354/290
[58] Field of Search ............... 358/335, 909, 310, 101, 358/106; 354/76, 290; 360/9.1

[56] References Cited

U.S. PATENT DOCUMENTS

| | | | |
|---|---|---|---|
| 3,631,781 | 1/1972 | Kennington et al. | 95/14 |
| 4,366,501 | 12/1982 | Tsunekawa et al. | 358/310 |
| 4,431,290 | 2/1984 | Kennedy | 354/113 |
| 4,499,487 | 2/1985 | Takayama et al. | 358/41 |
| 4,567,506 | 1/1986 | Shinoda et al. | 358/11 |
| 4,567,509 | 1/1986 | Takayama et al. | 358/29 |
| 4,586,080 | 4/1986 | Hoyt et al. | 358/106 |
| 4,593,312 | 6/1986 | Yamasaki | 358/909 |
| 4,635,123 | 1/1987 | Masunaga | 358/213 |
| 4,738,526 | 4/1988 | Larish | 354/76 X |

FOREIGN PATENT DOCUMENTS

0196009 7/1986 European Pat. Off. .

Primary Examiner—L. T. Hix
Assistant Examiner—D. Rutledge
Attorney, Agent, or Firm—Jeffrey L. Brandt

[57] ABSTRACT

An image recording system is provided including a conventional photographic film camera, an electronic video camera, and an electronic flash. Synchronizing apparatus is provided such that, responsive to the actuation of the film camera shutter by a human operator, the flash is substantially immediately triggered to illuminate a subject. Responsive to the single flash illumination, the synchronizing apparatus synchronizes the operation of the video camera to the film camera such that the film camera captures a photographic image of the subject, and the electronic video camera captures a full frame image of a substantially identical view of the subject as two consecutive video fields. The video camera is further synchronized such that the flash illumination is substantially entirely and equally distributed between the two fields of video information. The video camera normally operates in a movie format according to NTSC standards. The capturing of the video image is accomplished by inhibiting, during the flash illumination, any transfer of charge from photosites to shift registers in a video imager contained in the video camera. Upon termination of the flash illumination, the next two video fields are transferred to provide a full video frame of the subject of interest.

30 Claims, 8 Drawing Sheets

"LEADING EDGE" OPERATING CONDITION

IMAGE RECORDING SYSTEM

FIELD OF THE INVENTION

The present invention relates generally to image recording systems, and more particularly to an image recording system comprising a video camera and a photographic film camera synchronized to capture substantially identical images of a subject during a single flash illumination.

BACKGROUND OF THE INVENTION

In many applications, it is desirable to record substantially identical photographic film and electronic video images of a subject. The recorded video images can then be used, for example, as electronic "proofs" of the picture composition before the expense of developing and printing the photographic negatives is incurred. As is well known to those skilled in the art, flash illumination is required for most indoor, and some outdoor, photographic opportunities. During such a flash exposure, the film camera lens remains open for a predetermined period of time, while the flash illumination is provided during a window of time within this predetermined period. Because the flash illumination substantially entirely defines the exposure onto the photographic film, and because the flash illumination time is short, the operation of the film and video cameras must be carefully synchronized to obtain substantially identical images. This synchronization is not believed to be satisfactorily provided by currently known imaging systems.

European Patent Application No. 0 196 009 shows a still camera wherein a photosensitive film and a solid state imaging element are positioned in a single camera body to record substantially identical views of a subject. Apparatus is provided for viewing the stored video images, for example to preview the film images, on a small, attached display. This patent suffers from the disadvantage, however, that while a conventional electronic flash "shoe" attachment is shown, no suggestion is made as to how the film exposure and video recording are synchronized to a flash illumination.

U.S. Pat. No. 4,635,123 to Masunaga et al. shows an electronic imaging system incorporating a solid state image pick-up device, including a photoelectric conversion portion and a memory portion, operating in synchronization with a flash. The system operates to record a full frame video image of a subject subsequent to the triggering of the flash. The patent shows several methods of synchronizing the flash with the pick-up device such that flash illumination is inhibited during the transfer of charge from the photoelectric conversion portion to the memory portion. The patent further shows several electronic imaging systems wherein the illumination provided is based on the accumulation of charge within the image device, so as to obtain a proper exposure of the pick-up device.

The Masunaga et al. patent does not show or suggest the synchronization of the electronic imaging system with a photographic film camera. Further, the synchronization of the flash to the video components of the imaging system inherently produces undesirable results in the recording of the video image. More specifically, because the flash illumination is delayed during the transfer of charge within the pick-up device, a time period of up to 1/60 of a second, the image recorded will not be exactly what the operator intended to record. This period of time may be sufficient, for example, for a human subject to blink and alter the intended image.

U.S. Pat. No. 4,366,501 to Tsunekawa et al. shows a video image recording system synchronized to operate with an electronic flash so as to record a full frame video image of a subject pursuant to the actuation of a release and the triggering of the flash. In a first mode of operation a solid state imager accumulates untransferred dark current between picture recordings. Upon activation of the release, a frame of charge is transferred from the imager to "clear" it in preparation for recording. The flash is then triggered, and the next two consecutive fields of video information are recorded in a frame store. In a second mode of operation, the imager is operated in a "movie" mode, that is, it is read periodically at an NTSC compatible data rate. When the flash is used, the release is actuated, and the triggering of the flash is delayed to coincide with the completion of a charge transfer within the imager.

The Tsunekawa et al. patent does not show or suggest any synchronizing of the video image recording system with a film camera. Further, similarly to the Masunaga et al. patent discussed above, the operation of the flash is synchronized to the operation of the video camera. This necessitates the above described delay of at least one video field (i.e. 1/60th of a second), and possibly one frame (1/30th of a second), between the activation of the release button and the triggering of the flash to illuminate the subject. As described above, such delays are inherently undesirable in the operation of imaging systems.

Systems are known in which separate photographic film and video cameras are arranged to synchronously record a substantially identical subject image during a single illumination of an electronic flash. These systems, one example of which is the Noritsu model VSS-2, are typically NTSC compatible, with the recorded video image being displayable on a conventional NTSC video display. These systems suffer, however, from the disadvantage that only one half of the NTSC video frame (i.e. one field) is recorded in synchronization with the flash illumination. The resulting video images are substantially lacking in detail, especially when they are displayed on high resolution video monitors.

SUMMARY OF THE INVENTION

It is a principle object of the present invention to provide a method and apparatus for recording images of a subject in electronic and photosensitive mediums wherein film and video cameras are synchronized to capture substantially identical film and full frame video images with a single flash illumination.

Another object of the present invention is to provide a method and apparatus of the above-described type wherein the flash illumination is distributed relatively equally between two fields of video information comprising the full frame video image.

A further object of the present invention is to provide a method and apparatus of the above described type wherein the flash illumination can be substantially immediately initiated in a random (i.e. asynchronous) manner with respect to the operation of the video components of the system.

Another object of the present invention is to provide a method and apparatus of the above described type which is NTSC compatible.

A further object of the present invention is to provide a method and apparatus of the above-described type which can be implemented using substantially conventional film and video cameras.

In accordance with the present invention, a method is provided for recording an image including the step of illuminating a subject with a flash illumination. A photographic image of the subject is captured on a photosensitive medium, and a full frame video image of the subject is recorded in two consecutive fields of video data. The recording of the full frame video image is synchronized to the capturing of the photographic image such that the flash illumination is relatively equally distributed between the two consecutive fields of video data.

In a preferred embodiment of the invention, substantially identical views of the subject are directed to both the film and video cameras. The video camera includes a solid-state imager operating in a movie mode with a periodic transfer of charge from photosites to shift registers. The flash illumination is provided substantially immediately upon the request of an operator—i.e. asynchronously to the operation of the video camera. The recording of the full frame video image is performed by inhibiting, during the flash illumination, any charge transfer from photosites to shift registers in the video imager. Upon termination of the flash illumination, the two consecutive fields of video data are transferred to the shift registers, and subsequently to a permanent storage medium, whereby to record the full video frame containing the subject of interest.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DESCRIPTION OF THE PREFERRED EMBODIMENT

Figure 1:
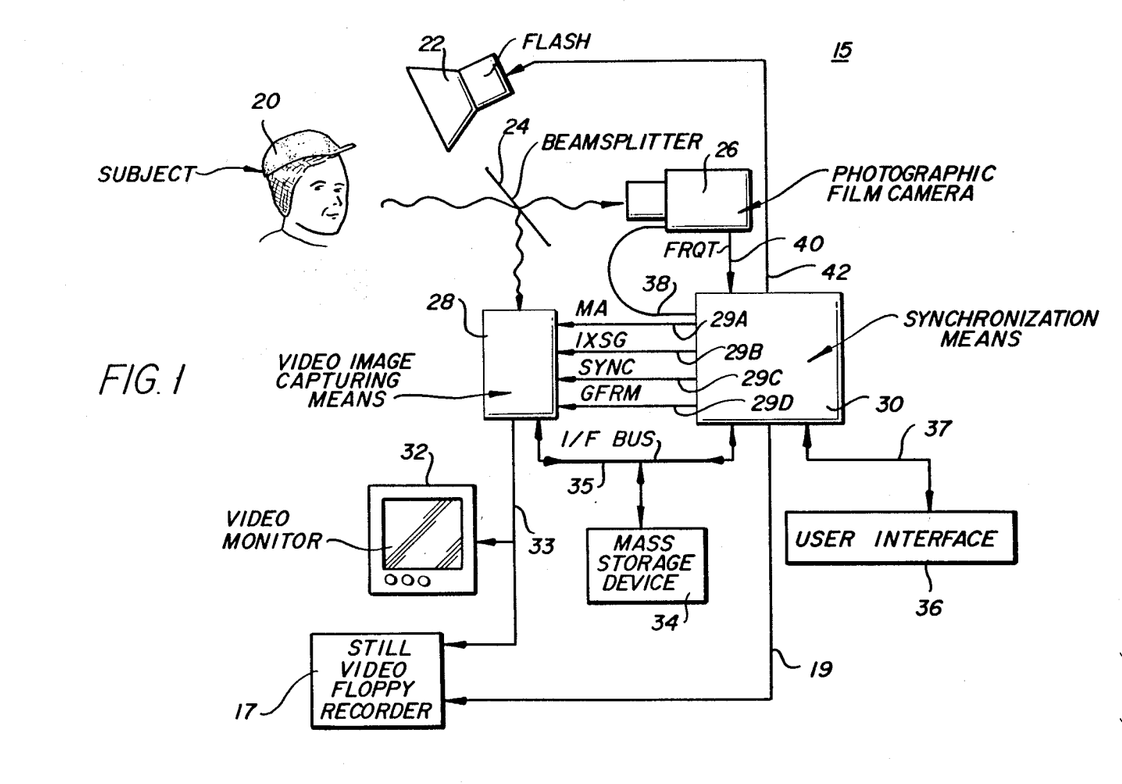
FIG. 1 is a block diagram of an image recording system constructed in accordance with the present invention.

Referring now to FIG. 1, an image recording system 15 is shown including a beamsplitter 24 situated to direct light reflected from a subject 20 to both a photographic film camera 26 and a video image capturing means 28. Film camera 26 comprises, for example, A Mamiya model RB67, while video image capturing means 28 is described in further detail below. Beamsplitter 24 is preferably positioned such that the images of subject 20 directed to photographic film camera 26 and video image capturing means 28 are substantially identical.

A synchronization means 30 is connected to the shutter release button (not shown) of film camera 26 by a mechanical, shutter activation cable 38, and to the "PC" electrical connector of the camera by an electrical connection 40. As is known to those skilled in the art, film camera 26 generates a flash request (FRQT) signal over connection 40 when its shutter is activated. It will be understood that, while electrical connections between system components are typically drawn as a single line, they may actually comprise multiple signal lines as is conventional in the art or described herein.

Synchronization means 30 is connected to video image capturing means 28 via four signal connections 29A, 29B, 29C, 29D. Signal connections 29A-D conduct, respectively, a move aperture (MA) signal, an inhibit transfer gate signal (IXSG), a synchronization signal (SYNC), and a grab frame signal (GFRM). The operation of synchronization means 30, and the function of these signals, is explained in detail below. Synchronization means 30 is further electrically connected to an electronic flash 22 via a flash "PC" cord connector 42. Flash 22 comprises, for example, the commercially available Speedotron System, available from Speedotron Corp.

A video monitor 32, for example a Sony model PVM 1910, is electrically connected to video image capturing means 28 by an electrical connection 33. A mass storage device 34, for example a Winchester hard disc of the type available from Quantum Corp. as model Q280, is electrically connected to video image capturing means 28 and synchronization means 30 via an appropriate, general purpose disc interface bus 35. Such an interface could comprise, for example, the Small Computer Systems Interface as defined by proposed ANSI standard X3T9.2. A user interface 36, adapted for operation by a human operator, is electrically connected to synchronization means 30 via connection 37 for permitting the operator to set selectable system parameters. User interface 36 comprises, for example, an alpha numeric keyboard with a liquid crystal display (LCD). An optional still video floppy recorder 17, for example a Kodak model SV7400, is shown connected to video image capturing means 28 via connection 33, and to synchronization means 30 via a connection 19. Recorder 17 receives NTSC video data from connection 33, and control data from connection 19.

Figure 2:
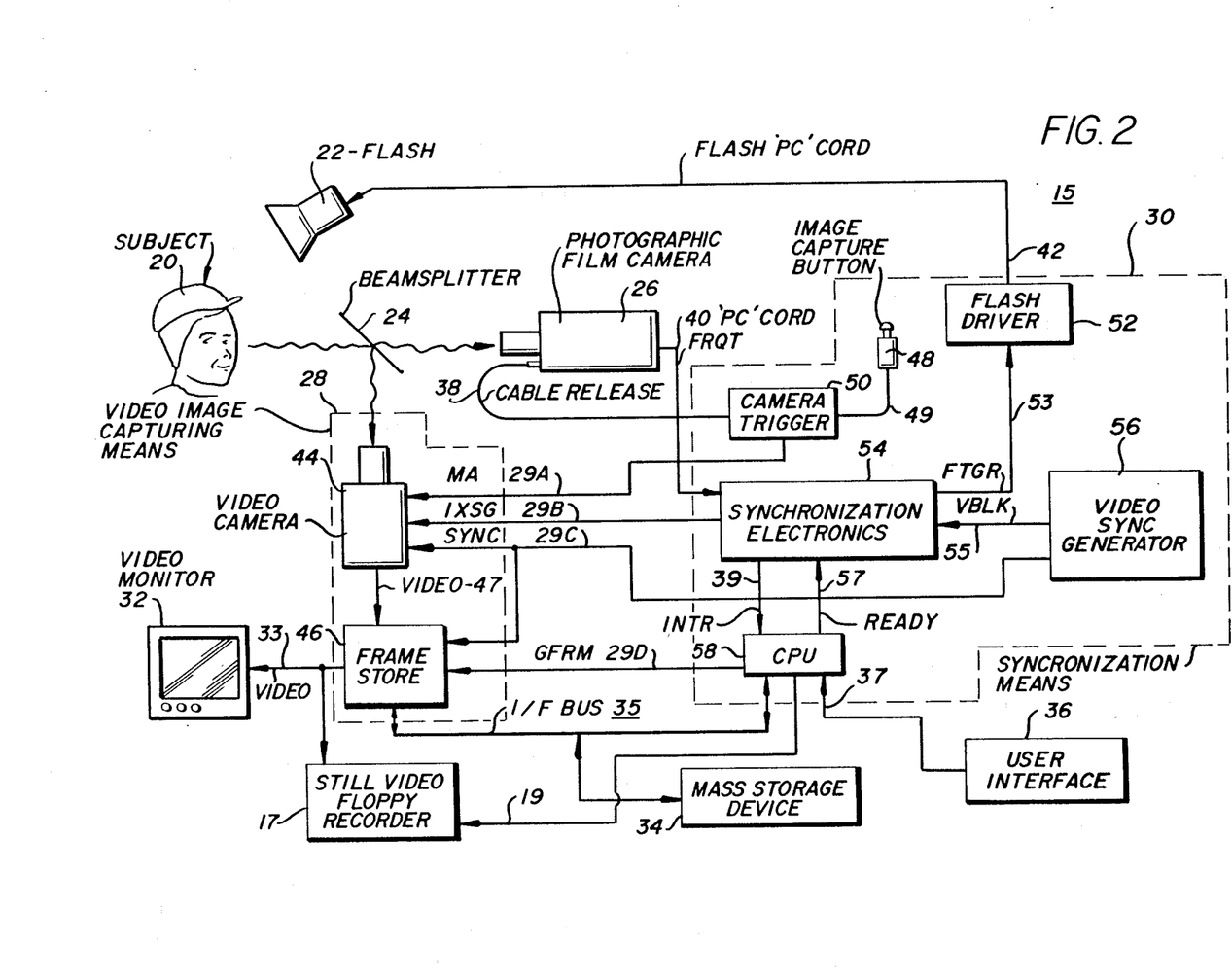
FIG. 2 is a block diagram of the image recording system of FIG. 1 showing further detail.

Referring now to FIG. 2, video image capturing means 28 is seen to comprise a video camera 44 and a frame store 46. Video camera 44 comprises, for example, a conventional NTSC standard video camera such as a Sony model DXC102 modified to permit control of a transfer frame signal (in a manner described in detail below), while frame store 46 comprises, for example, an AT&T Co. model Targa 24. Video camera 44 is electrically connected to frame store 46 via connection 47 for sending video image signal information to the latter. Video camera 44 receives signals MA, IXSG, and SYNC from synchronization means 30 along respective signal connections 29A, 29B, 29C. Frame store 46 receives the GFRM signal from synchronization means 30 via signal connection 29D. Video synchronization generator 56 is connected to synchronization electronics 54 via a connection 55 for sending the NTSC vertical blanking signal (VBLK) thereto.

Continuing to describe FIG. 2, synchronization means 30 comprises a pressure actuable image capture button 48, a camera trigger module 50, a flash driver circuit 52, a synchronization electronics circuit 54, a video sync generator 56, and a central processing unit (CPU) 58. Video synchronization generator 56 comprises a standard NTSC synchronization signal generator, for example a Fairchild 3262A NTSC sync. generator integrated circuit (IC). Image capture button 48 is mechanically connected to film camera trigger module 50 by a cable 49, the trigger module in turn being mechanically connected to photographic film camera 26 via mechanical cable release 38. Film camera trigger module 50 is electrically connected to video image capturing means 28 via connection 29A for sending move aperture signal MA. Flash driver circuit 52 comprises, for example, a silicon controlled rectifier (SCR) switch circuit of a type well known to those skilled in the art.

Flash driver 52 is electrically connected to flash 22 via connection 42, and to synchronization electronics 54 via connection 53. As will be described in further detail hereinbelow, responsive to a flash request FRQT signal from camera 26, synchronization electronics 54 generates a flash trigger signal FTGR for activating flash 22 to illuminate subject 20.

Continuing to describe FIG. 2, synchronization means 30 further includes a computer, or central processing unit (CPU) 58 electrically connected to synchronization electronics 54 via INTR and READY signal connections 39, 57, respectively. CPU 58 is further connected to frame store 46 via connection 29D, user interface 36 via connection 37 and mass storage device 34 via interface bus 35.

Figure 3:
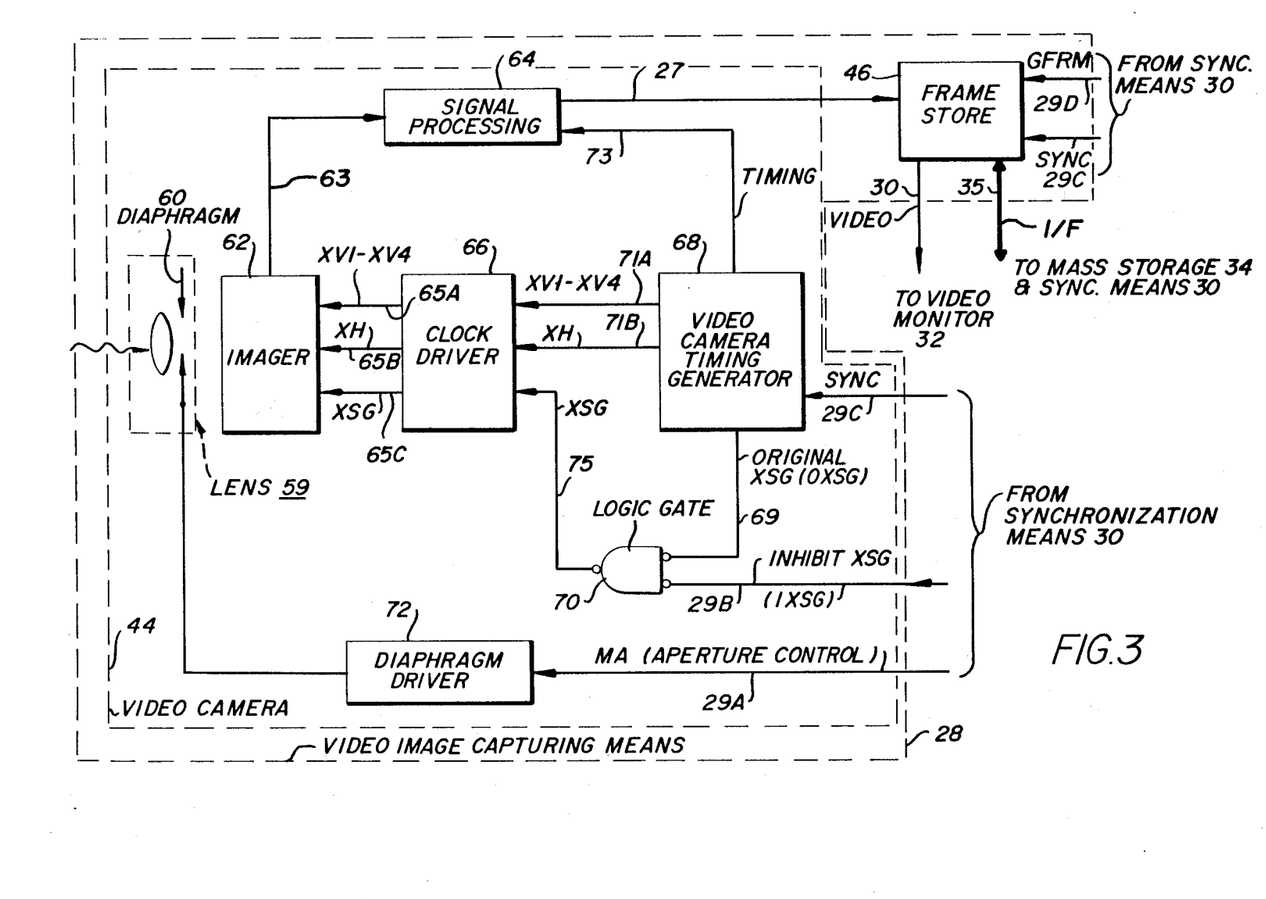
FIG. 3 is a block diagram of the video image capturing means of FIG. 2 showing further detail.

Referring now to FIG. 3, video camera 44 is seen to include a lens mechanism 59 including a diaphragm 60, a solid-state imager 62, a signal processing circuit 64, a clock driver 66, a video camera timing generator 68, a logic gate 70, and a diaphragm driver 72. Diaphragm 60, controlled by mechanically connected diaphragm driver 72, which is in turn controlled by move aperture control signal MA via connection 29A from synchronization means 30, functions to regulate the amount of light impinging upon imager 62. Imager 62 is electrically connected to signal processing circuit 64 via connection 63 for transmitting image information thereto.

Video camera timing generator 68 generates and transmits an original transfer gate signal (OXSG) via connection 69 to one input of logic gate 70. Video camera timing generator 68 also produces phasing (XVI–XV4, XH) and timing signals which are synchronized to the synchronization signal SYNC of video sync generator 56. Video camera timing generator 68 provides these phasing signals (XVI-XV4, XH) to clock driver 66 via signal connections 71A, 71B, respectively, and the timing signals to signal processing circuit 64 via signal connection 73. Clock driver 66 is electrically connected to imager 62 for sending image transfer gate (XSG) signal and phasing signal (XVI-XV4, XH) information on connections 65A, 65B, 65C, respectively. Logic gate 70 has two inputs—the original transfer gate signal OXSG from video camera timing generator 68 and the inhibit transfer gate signal IXSG from synchronization means 30. The inhibit transfer gate signal IXSG is utilized by synchronization means 30 to prevent transfer gate signal XSG of video capturing means 28 from going logically low. Logic gate 70 has one output signal line which connects to clock driver 66 via connection 75 for sending a transfer gate signal (XSG).

Frame store 46, as shown in FIG. 3, receives video signal information from signal processing circuit 64 via an electrical connection 77. In addition, frame store 46 receives synchronization signal SYNC from video synchronization generator 56 via connection 29C. Instructions for grabbing a frame of video information are received by frame store 46 on GFRM signal connection 29D, which originates from synchronization means 30. The detailed operation of video camera timing generator 68 and clock driver 66 will be described below with respect to the timing diagrams in FIGS. 6–8.

Figure 4:
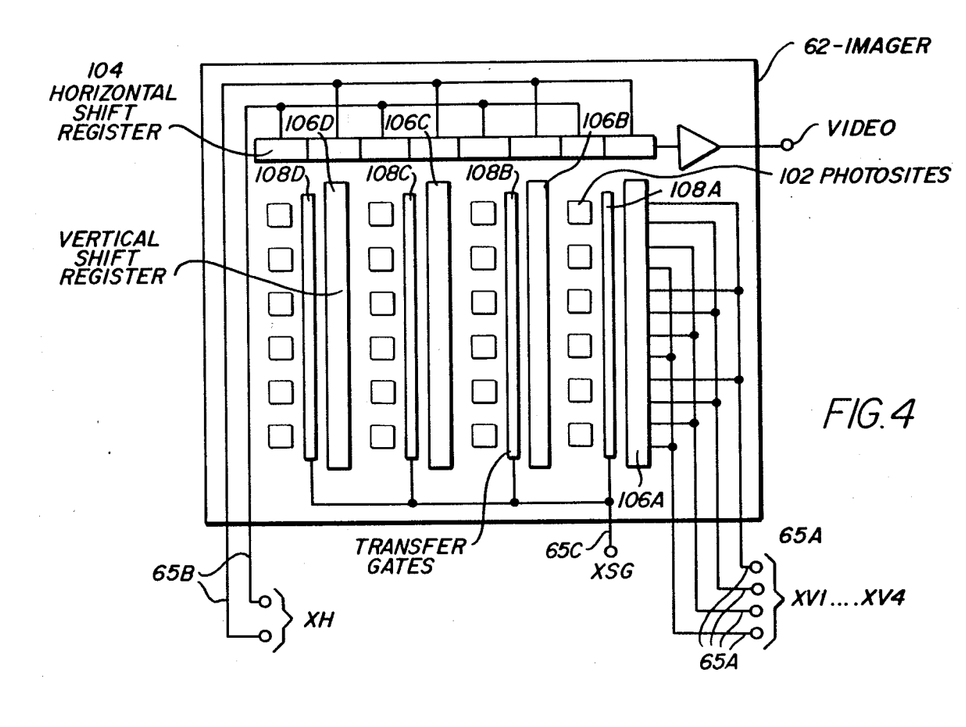
FIG. 4 is a schematic diagram of the interline transfer imaging device used in the video camera of FIG. 3.

Referring now to FIG. 4, a block diagram view of imager 62 is shown, including features well known to those skilled in the art. It will be understood that imager 62 comprises a conventional interline-transfer image sensor, for example Sony model ICX-018. Imager 62 includes a plurality of photosites 102 for collecting charge in accordance with the pattern of light reflected from image 20 (FIGS. 1, 2). Imager 62 further includes a horizontal shift register 104 responsive to phasing signal XH, and four vertical shift registers 106A, 106B, 106C, 106D responsive to phasing signals XV1-XV4. Four transfer gates, 108A, 108B, 108C, and 108D, are disposed between corresponding photosites and vertical shift registers 106A–D for controlling the transfer of charge accumulated at the photosites to the shift registers. Transfer gates 108A–D are responsive to transfer gate signal XSG for controlling this transfer of the charge.

In operation, when transfer gate signal XSG is low, the image charge packets that have collected in photosites 102 transfer through adjoining transfer gates 108A–D to a corresponding vertical charge-coupled device (CCD) shift register 106A–D. Once the charge packets are registered in vertical shift registers 106A–D, the vertical phasing signals XV1–XV4 operate to transfer the charge packets to horizontal CCD shift register 104, from which they are transferred off the image sensor under the control of horizontal phasing signal XH. Vertical and horizontal transfers are accomplished by biasing the registers with the respective phasing signals to form an array of independent potential wells, which are then shifted by varying the bias levels of the phasing signals in tandem.

Figure 5:
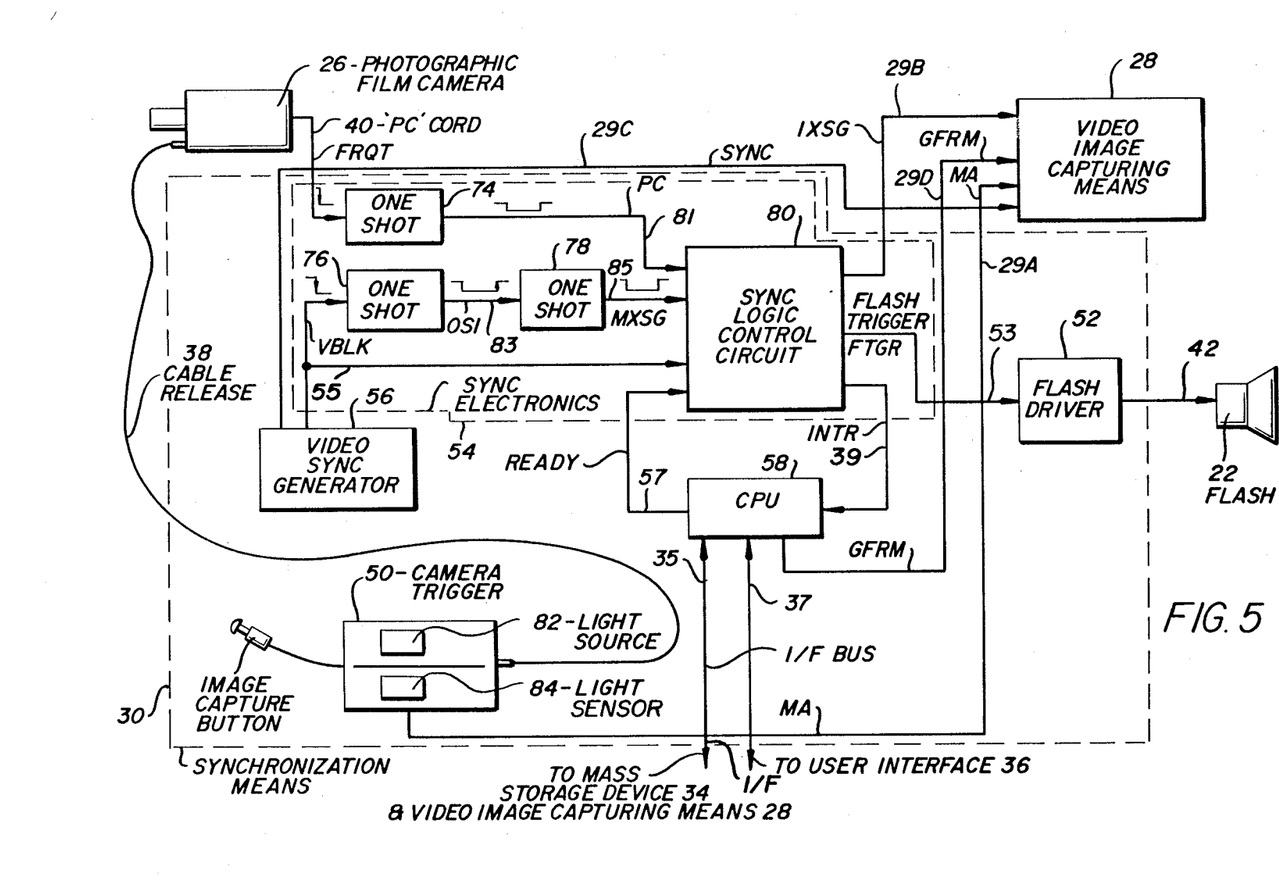
FIG. 5 is a block diagram of the synchronization means of FIG. 2 showing further detail.

Referring now to FIG. 5, synchronization electronics 54 comprises: three one-shots, 74, 76, 78, the latter two being serially connected, and a synchronization logic control circuit 80. Synchronization logic control circuit 80 comprises, for example, a digital state machine or a central processing unit (CPU) programmed to function in accordance with the detailed operation described below. One shot 74 receives a flash request (FRQT) signal from photographic film camera 26 via film camera "PC" cord 40. The 4 millisecond duration flash simulation signal PC of one shot 74 is sent to synchronization logic control circuit 80 by way of connection 81. One shot 76 receives the vertical blanking signal VBLK from video sync generator 56 on connection 55. The output signal from one shot 76 is connected to the input of one shot 78 via electrical connection 83. One shot 78 produces an modified transfer gate signal MXSG, representing a simulated modified transfer gate signal (i.e. a modified XSG signal), and is connected to an input of synchronization logic control circuit 80 via an MXSG signal connection 85. Synchronization logic control circuit 80 is further connected to CPU 58 via connections 39, 57. It will be understood that modified transfer gate signal MXSG is generated because the original transfer gate signal OXSG is not readily available from video camera 28. The same function, however, could be accomplished by modifying video camera 28 to provide the original gate transfer signal OXSG to synchronization logic control circuit 80.

Output signals from synchronization logic control circuit 80 include the inhibit transfer gate signal IXSG on connection 29B to video image capturing means 28, flash trigger signal FTGR on connection 53 to flash driver circuit 52, and the interrupt signal INTR on connection 39 to CPU 58. The exact operation of synchronization logic control circuit 80 will be described with respect to the timing diagrams in FIGS. 7-9 below.

Continuing to describe FIG. 5, film camera trigger module 50 comprises a camera trigger light source 82 and a camera trigger light sensor 84. Light source 82 is optically coupled to light sensor 84 such that actuation of image capture button 48 results in decoupling of light source 82 and light sensor 84. As a result of the optical decoupling, move aperture signal MA is sent from camera trigger module 50 to video image capturing means 28 on connection 29A.

In operation, image recording system 15 records substantially identical images of subject 20 in a film medium (not shown) situated in film camera 26, and electronically in video image capturing means 28, responsive to a single illumination of flash 22. Referring to FIGS. 1-5, subject 20 is situated relative to image recording system 15, and, in a manner well known to those skilled in the art, photographic film camera 26 is preset to perform flash photography. To initiate the recorded images, an operator actuates image capture button 48, and mechanical cable release 38 actuates the shutter of photographic film camera 26 to begin a flash exposure sequence. As part of its flash operating sequence, after a short delay during which the electrical and mechanical systems of photographic film camera 26 are activated, the film camera sends a flash request signal FRQT (a high to low signal transition) along the photographic film camera "PC" cord 40 to one shot 74 of synchronization electronics 54. Responsive to the flash request signal FRQT, one shot 74 generates logical low-going PC pulse for a 4 msec duration, the duration being selected to simulate the maximum illumination duration of typical studio flash 22. It will be noted by the reader that the terms signal and pulse are used interchangeably.

To understand the synchronization of film camera 26 and video image capturing means 28, it is first necessary to understand the operation of the latter as the PC pulse is being generated. Referring back to FIGS. 3 and 4, video image capturing means 28 normally operates in a "movie mode", with diaphragm 60 functioning to regulate the amount of light reflected from subject 20 which impinges on image sensor 62. In the movie mode, diaphragm 60 is held at an open, ambient setting, and the photosensitive region (i.e. photosites 102) of imager 62 is continuously irradiated by scene ambient light (typically referred to as modeling light). The video signal generated by image sensor 62 is converted into a line sequential color signal by signal processing section 64. Video camera timing generator 68 synchronizes signal processing circuit 64 with image sensor 62. In particular, the timing generator 68 produces the original transfer gate signal OXSG, and the phasing signals XVI . . . XV4 and XH. Appropriate synchronization timing signals are generated in video camera timing generator 68 and transferred to signal processing circuit 64 via connection 73. Because the exposure time of imager 62 is fixed to accord with the standard NTSC video image rates (i.e. 30 frames/second and 60 fields/second—each frame comprising consecutive 'odd' and 'even' fields), the imager is repetitively processed at a corresponding image frequency of 30 frames/second. That is, 30 full frames/second of video information are read from imager 62 and processed by signal processing circuit 64 under the control of video camera timing generator 68. The video signal is continuously displayed on video monitor 32 and, at the appropriate time, is recorded in frame store 46 and stored on mass storage device 34.

In summary, prior to the initiation of a recorded image by the actuation of image capture button 48, video monitor 32 is displaying a constant, motion picture of subject 20 as sensed by imager 62 in video camera 44. (Alternatively, as described in detail below, after the recording of a video image, monitor 32 can be controlled to display the last-recorded image in frame store 46).

It will be appreciated that the operation of video image capturing means 28 is generally conventional. More information regarding the operation of another appropriate video camera (i.e. in addition to the Sony camera referenced above), including operation of an imager, can be found by referring to U.S. patent application Ser. No. 882,121, entitled "Asynchronous Still timing for A Video Camera Producing Movie or Still Images", filed in the name of R. M. Vogel on July 3, 1986, assigned to the assignee of the present invention, and incorporated herein by reference. It will also be understood that a different CCD frame/interline type imager, or an MOS photodiode array type imager, could be substituted for imager 62 with appropriate changes in timing.

Figure 6:
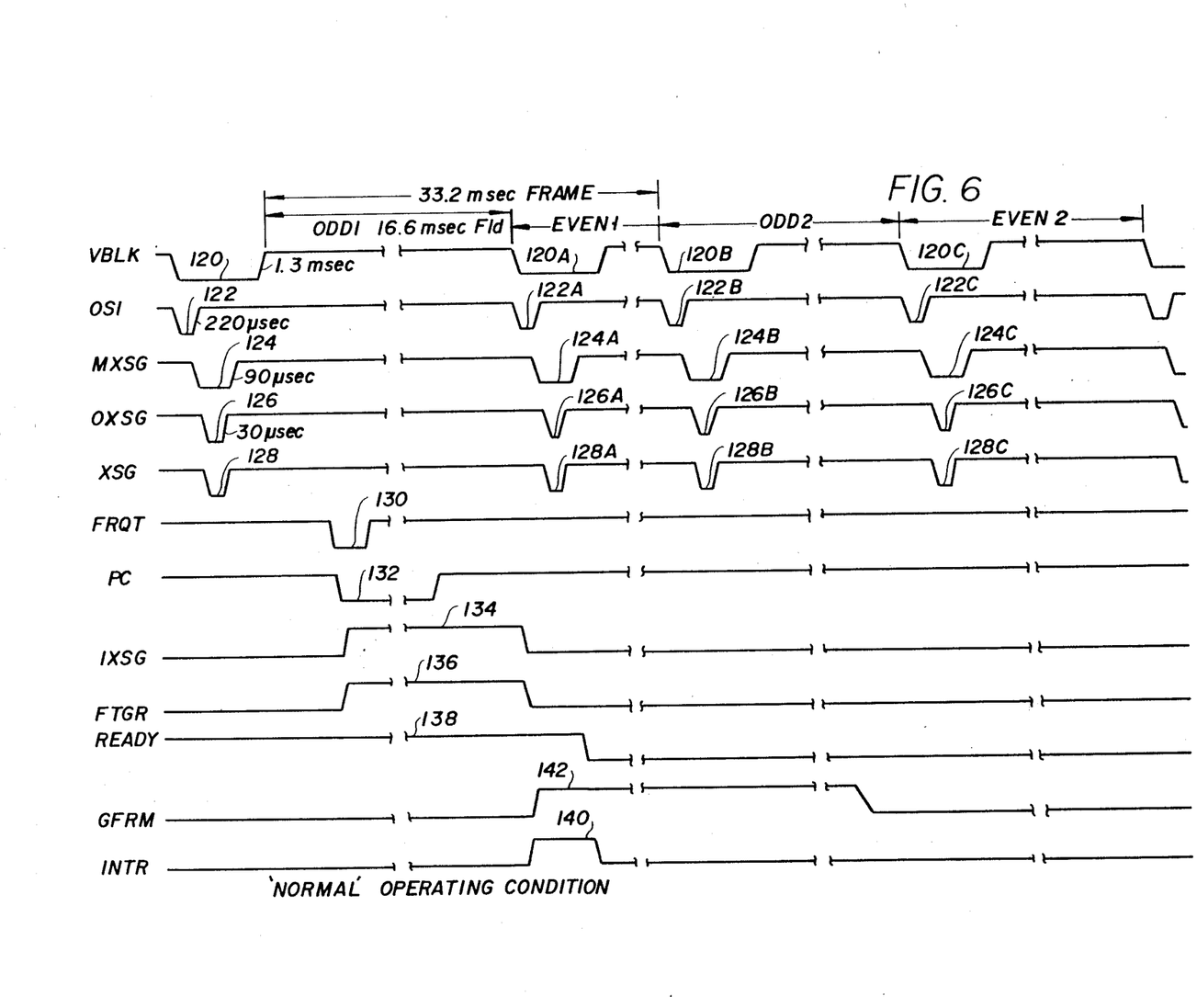
FIG. 6 is a timing diagram showing signal conditions when a simulated flash duration pulse occurs between the occurrence of modified transfer gate signal pulses.
Figure 7:
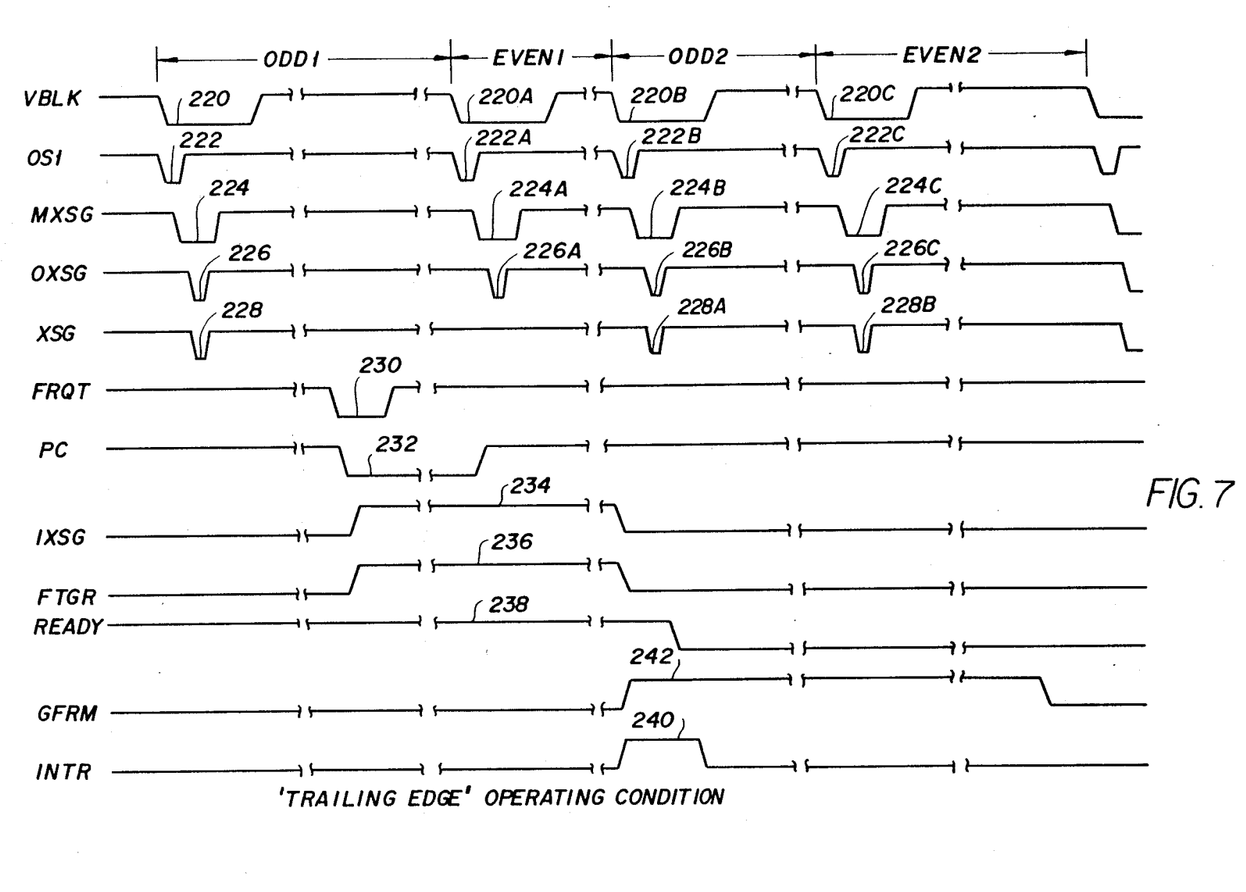
FIG. 7 is a timing diagram showing signal conditions when the trailing edge of a simulated flash duration pulse overlaps with the occurrence of a modified transfer gate signal pulse.
Figure 8:
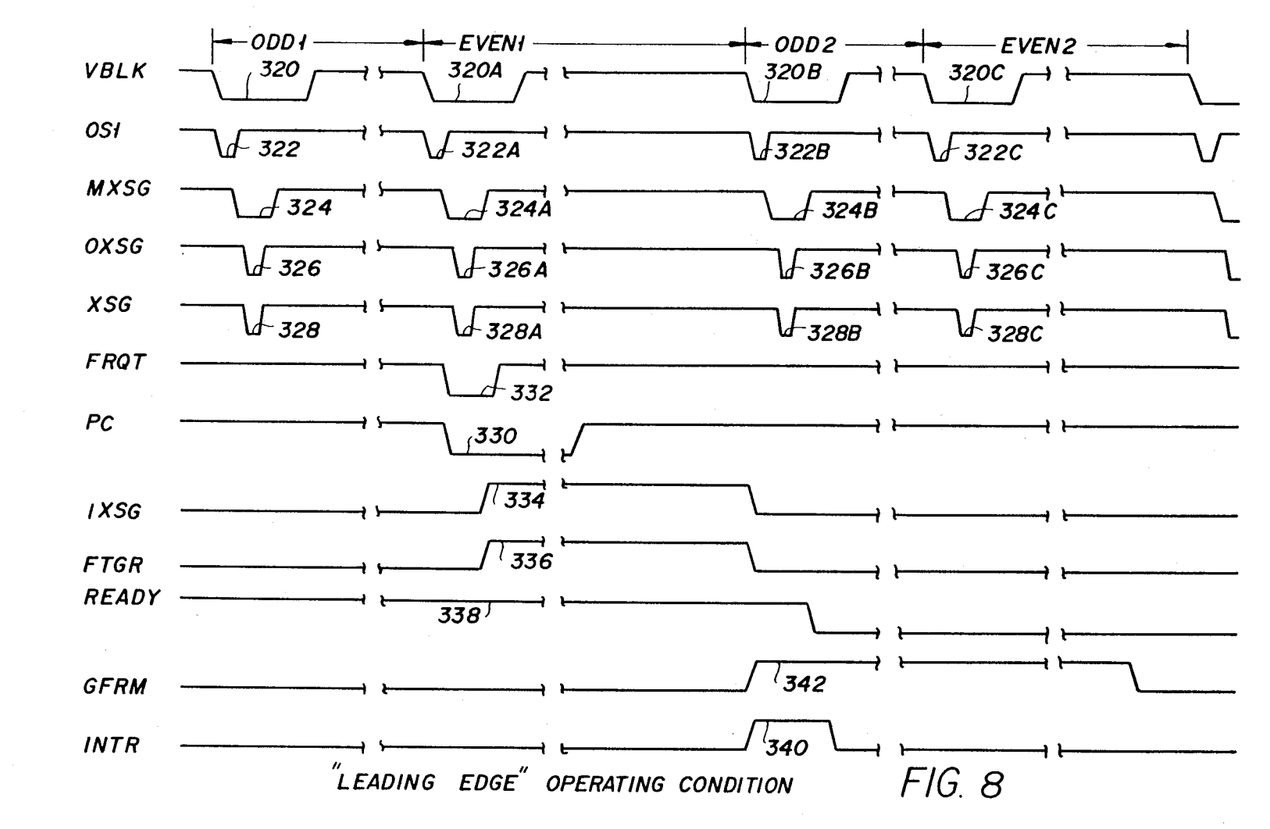
FIG. 8 is a timing diagram showing signal conditions when the leading edge of a simulated flash duration pulse occurs during the occurrence of a modified transfer gate signal pulse.

FIGS. 6, 7, and 8 show timing diagrams which, when considered in combination with FIGS. 1-6 above, describe in detail the operation of video imaging system 15. It will be understood that, for purposes of explanation and readability, the various pulses shown in these timing diagrams have not been drawn to scale. While the origin and destination of all of the signals depicted in FIGS. 6-8 have been shown and described above, for the purpose of convenience, the signal origins will now be briefly reviewed in the order in which the signals appear. Vertical blanking signal VBLK originates from video sync generator 56. One shot 76 of sync electronics 54 produces signal OS1. Modified transfer gate signal MXSG is produced from one shot 78 of sync electronics 54. Video sync generator 56, one shot 76, and one shot 78 are all shown in FIG. 5. Video camera timing generator 68 of video camera 44 produces original transfer gate signal OXSG. Transfer gate signal XSG is output from logic gate 70 of video camera 44. Both video camera timing generator 68 and logic gate 70 are shown in FIG. 3. One shot 74 of sync electronics 54 produces the flash simulation signal PC. Synchronization logic control 80 of sync electronics 54 produces inhibit transfer gate signal IXSG, flash trigger signal FTGR, and interrupt signal INTR. Ready signal READY is output from CPU 58. Note that synchronization electronics 54, one shot 74, synchronization logic control circuit 80, and CPU 58 are all shown in FIG. 5.

Image recording system 15 operates in one of four possible modes depending on the time a simulated flash signal PC is generated relative to the occurrence of a modified transfer gate pulse MXSG. More specifically, the generation of a transfer gate pulse XSG is inhibited during the illumination interval of flash 22. Charge accumulating on photosites 102 of imager 62 is thereby prevented from being transferred to shift register 108 during the period of illumination of flash 22.

It will be understood that a frame of video comprises two consecutive video fields, an ODD field and an EVEN field. In accordance with the present invention, the light energy of flash 22 is substantially entirely contained within a single frame, and relatively equally divided between the ODD and EVEN fields comprising a frame. If charge accumulated on photosites 102 of imager 62 was transferred during the illumination of flash 22, part of the light energy of the flash would be divided between two ODD or two EVEN fields. Thus, any given frame (one ODD and one EVEN field) would include fields containing unequal light energy. This unequal distribution of light energy would degrade the quality of the frame so as to cause interlace flickering.

As stated above, there are four modes of operation which must be considered. The first is a "normal" mode of operation wherein a simulated flash duration pulse PC is generated between occurrences of modified transfer gate pulses MXSG. This normal mode of operation is shown in the timing diagram of FIG. 6. The second mode is a "trailing edge" mode wherein the trailing edge of a simulated flash duration pulse PC occurs during the occurrence of an modified transfer gate pulse MXSG. This trailing edge mode of operation is shown in the timing diagram of FIG. 7. The third mode of operation is the "middle" mode, wherein the middle of flash duration pulse PC occurs during the occurrence of a modified transfer gate pulse MXSG. This middle mode is substantially identical to that of the trailing edge mode, with the differences being described below. Finally, the fourth mode of operation is the "leading edge" mode wherein a simulated flash duration pulse PC occurs during the occurrence of a modified transfer gate MXSG. The operation of this fourth leding edge mode is shown in FIG. 8.

Referring now to FIG. 6, in all modes of operation the vertical blanking signal VBLK 120 determines the video imaging rate of sync electronics 54 and hence video image capturing means 28. Vertical blanking signal VBLK 120 is generated by video synchronization generator 56, and comprises a negative going pulse having the standard NTSC frequency of 59.94 hertz (i.e. a pulse every 16.67 milliseconds (ms)) and a duration of 1.3 ms. Vertical blanking signal VBLK 120 is generated continuously during the operation of imaging system 15. For each vertical blanking pulse VBLK 120, video camera timing generator 68 produces an original transfer gate OXSG signal 126. The original transfer gate signal OXSG 126 is periodic, has a 32 usec duration, and starts 254 microseconds from the leading edge of vertical blanking signal VBLK 120. For purposes of description, once a pulse/signal such as VBLK 120 is numbered, subsequent, periodic occurrences of the same pulse are indicated with an alphabetic suffix (i.e. VBLK 120A).

The falling edge of each vertical blanking pulse VBLK 120 causes one-shot 76 to generate an OS1 pulse 122. The rising edge of each OS1 pulse 122 in turn causes one-shot 78 to generate a modified gate transfer pulse MXSG 124. Each OS1 pulse 122 is 220 microseconds (usec) in duration, and functions to position its correspondingly generated MXSG 124 pulse centered on the occurrence of an original gate transfer pulse OXSG 126. Each modified gate transfer pulse MXSG 124 is 95 usec in duration—i.e. three times the duration of an original gate transfer pulse OXSG 126, and functions to simulate an enlarged OXSG pulse.

As described above, FIG. 6 illustrates the normal mode of operation wherein a simulated flash duration pulse PC 132 occurs between the occurrence of modified gate transfer pulses MXSG 124, 124A–C. Examining the timing diagram of FIG. 6 in detail, it is seen that at the occurrence of the first vertical blanking pulse VBLK 120 (just prior to the beginning of video field ODD1), one shot 76 produces the first OS1 pulse 122. The rising edge of first OS1 pulse 122 causes one shot 78 to produce the first modified transfer gate pulse MXSG 124. The original transfer gate pulse OXSG 126 (produced by video camera timing generator 68) is synchronized to the video timing by the vertical blanking signal VBLK and hence synchronized to VBLK pulse 120. Because no simulated flash pulse PC has yet been generated, video camera 44 continues to generate one more gate transfer pulse XSG 128.

Responsive to the actuation of the image capture button 48, camera trigger module 50 sends a move aperture signal MA to video image capturing means 28. Diaphragm driver 72 of video image capturing means 28 receives the move aperture signal MA and adjusts diaphragm 60 from a large, live aperture setting to a smaller, flash aperture setting. Typically, the intensity of flash 22 is eight to sixteen times (i.e. three to four f-stops) the intensity of the ambient light. Thus, diaphragm 60 will typically be closed down three to four f-stops, and the flash illumination will comprise the vast majority of the charge present on imager 62. Substantially simultaneously, cable release 38 initiates a flash exposure sequence in film camera 26. As part of the film camera flash exposure sequence, film camera 26 sends a flash request signal FRQT 130 along "PC" cord 40. Responsive to the flash request signal FRQT 130, one shot 74 generates flash simulation signal PC 132.

In the normal mode of operation, synchronization logic control circuit 80 of synchronization means 30 is responsive to simulated flash pulse PC 132, a READY signal 138, and modified transfer gate signal MXSG 124 for generating an inhibit transfer gate pulse IXSG 134, a flash trigger pulse FTGR 136, and an interrupt pulse INTR 140. More specifically, when simulated flash pulse PC 132 goes low, synchronization logic control circuit 80 senses the level of the modified gate transfer signal MXSG 124. By definition, in the normal mode of operation, the modified gate transfer pulse MXSG 124 is expired, and the MXSG signal is high. Synchronization logic control circuit 80 generates high-going inhibit gate transfer pulse IXSG 134 and flash trigger pulse 136. Inhibit gate transfer pulse IXSG 136 blocks logic gate 70 of video camera 44, preventing another low-going transfer gate pulse XSG from being generated. Simultaneously, the rising edge of the flash trigger pulse FTGR causes flash driver 52 to initiate flash illumination by flash 22. In this normal mode of operation, the generation of the inhibit transfer gate pulse IXSG 136 does not affect the operation of imager 62 because no charge transfer is occurring at this time. Further, flash 22 is triggered substantially immediately upon the activation of image capture button 48, the only noticable delay being the delay inherent in the operation of film camera 22 in generating flash request signal FRQT 130.

At the occurrence of the next vertical blanking pulse VBLK 120A, synchronization logic control circuit 80 generates an interrupt pulse INTR 140 and terminates inhibit transfer gate and flash trigger pulses IXSG 134, FTGR 136, respectively. CPU 58 senses interrupt signal INTR 140 and instructs the video capturing means 28 to grab the following two fields (i.e. the full video frame comprising fields EVEN1 and ODD2) of video information by generating a grab frame signal GRFM 142. In addition, CPU 58 causes READY signal 138 to go low thereby instructing synchronization control logic circuit 80 to terminate interrupt pulse INTR 140. Ready signal 138 is normally high when system 15 is ready to capture a video frame, going low immediately after the capture of a video frame for a time sufficient to permit storage of that frame on mass storage device 34. After a short period of time sufficient to transfer the captured video image to mass storage device 34, CPU 58 asserts the READY signal again. This time allows system 15 to be reinitialized in preparation for capturing another image. It will thus be seen that, in this normal mode of operation, substantially the entire flash energy of flash 22 is contained in the video frame comprising fields EVEN1 and ODD2, and is relatively evenly distributed between the two fields.

FIG. 7 depicts the trailing edge mode of operation wherein the trailing (i.e. rising) edge of flash simulation pulse PC 232 occurs after a first modified transfer gate pulse MXSG 224 and during a second MXSG pulse 224A. To arrive at this trailing edge mode of operation, the image capture button 48 was actuated at a time such that the flash simulation signal PC 232 and the modified transfer gate signal MXSG 224 conditions shown in FIG. 7 result. Like pulses to those described above are indicated by like reference numerals incremented by 100. It will be understood that the sequence for generating vertical blanking pulse VBLK 220, OS1, modified transfer gate MXSG, and original transfer gate OXSG pulses, 220, 222, 224, 226, respectively, is identical to that described above with reference to FIG. 6.

At the actuation of the image capture button 48, camera trigger module 50 sends a move aperture signal MA to video image capturing means 28. Diaphragm driver 72 of video image capturing means 28 receives the move aperture signal MA and adjusts diaphragm 60 fro a large, ambient light aperture setting to a smaller, flash aperture setting. Substantially simultaneously, cable release 38 initiates a flash exposure sequence in film camera 26. As part of the film camera flash exposure sequence, film camera 26 sends a flash request signal FRQT 230 along "PC" cord 40. Responsive to the flash request signal FRQT 230, one shot 74 generates flash simulation signal PC 232.

Synchronization control logic circuit 80 senses the flash simulation signal PC 232 and the modified transfer gate signal 224A, and determines that there exists a trailing edge mode of operation. For the trailing edge mode of operation, synchronization control logic circuit 80 first senses flash simulation signal PC 232 low and modified transfer gate signal MXSG 224A high. Sync control logic 80 then generates high-going inhibit transfer gate signal 234 and flash trigger signal FTGR 236. Responsively, logic gate 70 of video camera 44 produces a high inhibit transfer gate signal IXSG 234 which functions to prevent transfer gate signal XSG from going low and enabling the transfer of charge in imager 62. Accordingly, field EVEN 1 is not transferred at this time, but, as is shown immediately below, the transfer of this data is delayed until field EVEN 2. Thus, the entire light energy of flash 22 will be captured in the subsequently transferred video frame. The rising edge of the flash trigger signal FTGR 236 causes flash driver 52 to initiate flash illumination by flash 22 in the manner described above.

In this trailing edge condition, the modified transfer gate signal MXSG 224A goes low while flash duration signal PC 232 is low. Synchronization control logic circuit 80 senses this condition and waits for the next occurring vertical blanking pulse VBLK 220B to deassert inhibit transfer gate signal IXSG 234 and flash trigger signal FTGR 236. Synchronization control logic circuit 80 then generates the high-going interrupt signal INTR 240. At the assertion of interrupt signal INTR 240, CPU 58 instructs frame store 46 of video image capturing means 28 to grab the following two fields (ODD2 and EVEN2 video fields) of video information by generating high-going grab frame pulse GFRM 242. As shown in FIGS. 6-8, this grab frame pulse GFRM 242 stays high for a duration of two fields while the video fields are stored in frame store 46. After generating grab frame signal GERM 242, CPU 58 deasserts the READY signal 238. As described above in the normal mode of operation with respect to FIG. 6, synchronization control logic circuit 80 then deasserts the interrupt signal INTR 240. The subsequent two fields (ODD2 and EVEN2) of video information are stored by frame store 46, and system 15 is thus reinitialized to prepare for another video signal store.

From a consideration of FIG. 7, it will be appreciated that, if the XSG pulse in field EVEN1 had not been inhibited, the light energy of flash 22 would have been distributed between fields EVEN1 and EVEN2. Thus, a frame comprising, for example, fields EVEN1 and ODD1, would not have contained all of the flash energy, and would include fields having unequal energy. This would lead to the undesirable result of interlace flickering. By inhibiting the transfer of field EVEN1, subsequently recorded fields ODD2, EVEN2 include all of the flash energy, substantially equally divided therebetween.

The third of the four possible operating conditions—the middle condition—occurs when a simulated flash duration pulse PC occurrs during the occurrence of an modified gate transfer pulse MXSG. This condition is substantially identical to the trailing edge condition shown and described with respect to FIG. 7 above. Signals for the middle condition are identical to those shown in FIG. 7 (i.e. the next occurrence of the transfer gate pulse XSG is inhibited, thereby preventing the distribution of the power of flash 22 over two ODD or two EVEN fields), with the exception that the flash simulation pulse PC would be positioned such that the modified gate transfer pulse MXSG would be within the bounds of the PC signal pulse trailing edge and the PC signal pulse leading edge.

The last of four possible operating modes is the leading edge mode, which will now be described with reference to FIG. 8. This mode of operation occurs when the image capture button 48 is actuated at a time such that the leading edge of the flash simulation pulse PC 330 occurs during the occurrence of modified gate transfer pulse MXSG 324A. Synchronization logic control circuit 80 senses modified transfer gate pulse MXSG 324A.

Responsive to the low/active state of both the flash simulation PC 330 and modified gate transfer MXSG 324A pulses, synchronization logic control circuit 80 continuously monitors the states of the PC and MXSG signals. When the flash simulation signal PC 330 goes low while the modified gate transfer signal MXSG 324A is low, synchronization logic control circuit 80 monitors the state of the MXSG signal until it goes high again at the rising edge of MXSG 324A. At the occurrence of the high-going edge of MXSG 324A, synchronization logic control circuit 80 generates the high-going inhibit transfer gate pulse IXSG 334 and flash trigger pulse FTGR 336. With inhibit transfer gate pulse IXSG 334 high, logic gate 70 of video camera 44 produces a high signal output thus preventing transfer gate signal XSG from going active low. Because the original gate transfer signal OXSG is high, asserting the inhibit gate transfer pulse IXSG 334 has no effect on the transfer gate signal XSG. The rising edge of the flash trigger signal FTGR 336 causes flash driver circuit 52 to initiate flash illumination by flash 22. It will be appreciated that, in this mode of operation, there is a miniscule delay between the low-active flash request pulse FRQT 332 and the generation of the high-active flash trigger pulse 334. However, because of the relatively short duration of the delay (i.e. a maximum of 96 microseconds - the width of the modified gate transfer MXSG pulse), the delay has no effect on the images captured by film camera 26 or recorded by video image capturing means 28. Further, the delay functions to insure that the light energy of flash 22 is entirely and equally distributed between the stored video frame of fields ODD2, EVEN2 as described below.

To complete this leading edge condition of operation, at the next occurrence of vertical blanking signal VBLK 320B, synchronization logic control circuit 80 generates high-going interrupt pulse INTR 340 and deasserts inhibit transfer gate pulse IXSG 334 and flash trigger pulse FTGR 336. CPU 58 responds to interrupt signal INTR 340 by generating grab frame signal GFRM 342. Frame store 46 then captures the following frame of video information, shown in FIG. 8 as video fields ODD2 and EVEN2. CPU 58 then deasserts ready signal READY 338 whereby synchronization logic control circuit 80 deasserts interrupt signal INTR 340. After the two fields of video information are recorded in mass storage device 34 and the system is reinitialized, CPU 58 again generates the READY signal. Once CPU 58 reasserts the READY signal, image capturing system 15 is again ready to capture the next full frame video image.

In the embodiment of the invention shown and described herein, the master synchronizations for synchronizing the operation of the video portions are derived from synchronization means 30, and the video image capturing means 28 is slaved thereto. It will be understood that the invention is not so limited, and that the master synchronization signals for the video circuitry can be derived from video camera 44 in a manner readily apparent to those skilled in the art.

There is thus provided an image capturing system for capturing substantially identical images of a subject in a film medium and as a full frame electronic video image with a single illumination of a electronic flash. The full frame electronic video image includes two consecutive video fields, each having a relatively equal distribution of the flash illumination, whereby to provide a high quality video image free from interlace flickering. The video camera can be operated in a movie mode, permitting an operator to view the subject on the video screen to compose the picture. The flash illumination can be initiated substantially immediately at random (i.e. asynchronously with respect to the operation of the video portions of the system) to record the exact image desired by the operator. The system can be implemented in large part with standard photographic and video equipment.

While a preferred embodiment of the invention has been illustrated and described, it will be clear that the invention is not so limited. Numerous modifications, changes, variations, substitutions and equivalents will occur to those skilled in the art without departing from the spirit and scope of the present invention.

What is claimed is:

1. A system for recording images of a subject in electronic and photosensitive mediums, comprising:
    means for capturing a photographic image of said subject on said photosensitive medium;
    means for recording a full frame video image of said subject in two consecutive fields of video information;
    means for illuminating said subject with a flash illumination; and
    means connected to said capturing means, said recording means, and said illuminating means for actuating said illuminating means and for synchronizing the recording of said full frame video image to the capturing of said photographic image such that said flash illumination is relatively equally distributed between said two consecutive fields of video information.

2. An image recording system in accordance with claim 1 and further including means for directing substantially identical views of said subject to said capturing and recording means.

3. An image recording system in accordance with claim 2 wherein said directing means comprises a beamsplitter.

4. An image recording system in accordance with claim 1 wherein said actuating and synchronizing means includes means for initiating illumination by said illuminating means substantially immediately upon the request of an operator.

5. An image recording system in accordance with claim 4 wherein said capturing means includes:
    shutter means for controlling the exposure of said photosensitive film; and
    means responsive to the actuation of said shutter means for generating a flash request signal to actuate a flash.

6. An image recording system in accordance with claim 5 wherein said initiating means initiates said flash illumination responsive to the generation of said flash request signal.

7. An image recording system in accordance with claim 1 wherein said recording means includes a solid-state video imaging device comprising:
    photosite means for converting a light image of said subject into a full video frame of electronic data; and
    means for transferring said electronic data from said photosite means to a permanent storage means.

8. An image recording system in accordance with claim 7 wherein said transferring means comprises:
    at least one shift register for registering the electronic data in said photosite means; and transfer gate means for controlling the transfer of the electronic data from said photosites to said shift register.

9. An image recording system in accordance with claim 7 wherein said recording means further includes means for periodically actuating said transferring means to effectuate the transfer of said electronic data from said photosite means to said permanent storage means.

10. An image recording system in accordance with claim 9 wherein said actuating and synchronizing means includes means for inhibiting the transfer of said electronic data from said photosite means to said permanent storage means during said flash illumination.

11. An image recording system in accordance with claim 8 wherein said video imaging device comprises an interline solid state charge-coupled device.

12. An image recording system in accordance with claim 10 wherein said recording means further comprises signal processing means for converting said electronic data into line sequential video data.

13. An image recording system in accordance with claim 12 wherein said image recording system further includes frame store means for storing a full video frame of said line sequential video data.

14. An image recording system in accordance with claim 13 wherein said actuating and synchronizing means further includes means responsive to the termination of said flash illumination for directing said frame store means to store the full frame of said line sequential video data.

15. An image recording system in accordance with claim 14 wherein said full frame of video data is stored in said frame store means in a format of two consecutive fields of said line sequential video data.

16. An image recording system in accordance with claim 13 and further including a mass storage means connected to said frame store means for storing multiple frames of said line sequential video data.

17. An image recording system in accordance with claim 13 and further including video display means for displaying the line sequential video data stored in said frame store means.

18. An image recording system comprising:
means for capturing a photographic image of a subject on a photosensitive medium, including shutter means for controlling the exposure of said photosensitive medium, and means responsive to the actuation of said shutter means for generating a flash request signal to actuate a flash;
means for recording a full frame video image of said subject, including photosite means for converting a light image of said subject into a full video frame of electronic data, means for transferring said electronic data in said photosite means to a permanent storage means, and means for periodically actuating said transferring means to effectuate the transfer of said electronic data from said photosite means to said permanent storage means;
means for illuminating said subject with a flash illumination;
means for directing substantially identical views of said subject to said recording and capturing means;
actuating and synchronizing means connected to said capturing means, said recording means, and said illuminating means for actuating said illuminating means and for synchronizing the recording of said full frame video image to the capturing of said photographic image, including means for actuating said shutter means, means responsive to said flash request signal for initiating said flash illumination, and means for inhibiting said periodically actuating means during said flash illumination; and
means responsive to the termination of said flash illumination for storing said electronic data on said photosite means as two consecutive fields of line sequential video data.

19. A method for recording an image comprising the steps of:
illuminating a subject with a flash illumination;
capturing a photographic image of said subject on a photosensitive medium;
recording a full frame video image of said subject in two consecutive fields of video information; and
synchronizing the recording of said full frame video image to the capturing of said photographic image such that said flash illumination is relatively equally distributed between said two consecutive fields of video information.

20. A method in accordance with claim 19 and further including the step of directing substantially identical views of said subject to said capturing and recording means.

21. A method in accordance with claim 19 wherein said illuminating step is performed substantially immediately upon the request of an operator.

22. A method in accordance with claim 21 wherein said illuminating step is performed responsive to the initiating of said capturing step.

23. A method in accordance with claim 19 wherein said recording step is performed by:
converting a light image of said subject into a full video frame of electronic data;
selectively transferring said full video frame of electronic data to a permanent storage medium.

24. A method in accordance with claim 23 wherein said step of selectively transferring said full video frame of electronic data is performed periodically.

25. A method in accordance with claim 24 wherein said synchronizing step is performed by inhibiting the periodic transferring of said full frame of electronic data during said illuminating step.

26. A method in accordance with claim 25 wherein said recording step is further performed by converting said electronic data into line sequential video data.

27. A method in accordance with claim 26 wherein said recording step is further performed by storing said full video frame of electronic data as said line sequential video data.

28. A method in accordance with claim 27 wherein said recording step is further performed by storing said line sequential video data responsive to the termination of said illuminating step.

29. A method in accordance with claim 28 wherein said step of storing said line sequential video data is performed by storing said line sequential video data in a format of two consecutive fields.

30. A method in accordance with claim 28 and further including the step of displaying said line sequential video data on a video display.

* * * * *